(12) United States Patent
Verdier et al.

(10) Patent No.: US 10,954,908 B2
(45) Date of Patent: Mar. 23, 2021

(54) METHOD FOR MANAGING A TRANSIENT PHASE OF THE STARTING OF A HEAT ENGINE BY AN ELECTRIC MOTOR

(71) Applicants: Continental Automotive France, Toulouse (FR); Continental Automotive GmbH, Hannover (FR)

(72) Inventors: Damien Verdier, Toulouse (FR); Yannis Guillot, Ambres (FR); Jerome Lachaize, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 10 days.

(21) Appl. No.: 16/468,024

(22) PCT Filed: Dec. 12, 2017

(86) PCT No.: PCT/FR2017/053518
§ 371 (c)(1),
(2) Date: Jun. 10, 2019

(87) PCT Pub. No.: WO2018/109361
PCT Pub. Date: Jun. 21, 2018

(65) Prior Publication Data
US 2020/0011281 A1 Jan. 9, 2020

(30) Foreign Application Priority Data
Dec. 16, 2016 (FR) ...................... 1662636

(51) Int. Cl.
*F02N 11/00* (2006.01)
*B60K 6/26* (2007.10)
(Continued)

(52) U.S. Cl.
CPC ............... *F02N 11/04* (2013.01); *B60K 6/26* (2013.01); *B60K 6/38* (2013.01); *B60K 6/46* (2013.01);
(Continued)

(58) Field of Classification Search
CPC ...... B60K 2006/268; B60K 6/26; B60K 6/38; B60K 6/387; B60K 6/46; B60K 6/485;
(Continued)

(56) References Cited

U.S. PATENT DOCUMENTS

| 6,274,943 B1 | 8/2001 | Hasegawa et al. |
| 2008/0216787 A1 | 9/2008 | Kroepke et al. |
| 2015/0306949 A1* | 10/2015 | Ooki ..................... B60K 6/405 74/665 R |

FOREIGN PATENT DOCUMENTS

| DE | 10 2010 025 183 | 12/2011 |
| EP | 1 750 008 | 2/2007 |

OTHER PUBLICATIONS

DE 102010025183, Dec. 2011, Anshelm, machine translation.*
International Search Report—PCT/FR2017/053518—dated Mar. 21, 2018.

* cited by examiner

*Primary Examiner* — Phutthiwat Wongwian
*Assistant Examiner* — Diem T Tran
(74) *Attorney, Agent, or Firm* — Nixon & Vanderhye

(57) ABSTRACT

Disclosed is a method for managing the starting of a combustion engine of a hybrid drive system including a combustion engine and an electric machine, as well as a drive shaft, the electric machine producing torque to start the combustion engine and drive the drive shaft at least during
(Continued)

an initial phase of the start. In a transient starting phase, the combustion engine drives the drive shaft and the electric machine is stopped. The electric machine is regulated, during the initial phase and transient phases, with a first engine speed setpoint. The transient phase begins when the drive shaft reaches the first engine speed setpoint and remains steady. Torque control produced by the electric machine during the transient starting phase being configured so that the electric machine is stopped as soon as the control determines that the torque produced by the electric machine is tending toward zero torque.

11 Claims, 2 Drawing Sheets

(51) Int. Cl.
*F02N 11/04* (2006.01)
*B60K 6/38* (2007.10)
*B60K 6/46* (2007.10)
*B60W 10/02* (2006.01)
*B60W 10/06* (2006.01)
*B60W 10/08* (2006.01)
*B60W 20/40* (2016.01)
*F02D 41/00* (2006.01)
*F02D 41/06* (2006.01)
*F02D 41/30* (2006.01)
*F02N 11/08* (2006.01)

(52) U.S. Cl.
CPC ............ *B60W 10/02* (2013.01); *B60W 10/06* (2013.01); *B60W 10/08* (2013.01); *B60W 20/40* (2013.01); *F02D 41/0097* (2013.01); *F02D 41/062* (2013.01); *F02D 41/3005* (2013.01); *F02N 11/0848* (2013.01); *B60K 2006/268* (2013.01); *B60Y 2200/92* (2013.01); *B60Y 2300/43* (2013.01); *F02D 2200/101* (2013.01); *F02N 2200/022* (2013.01); *F02N 2200/042* (2013.01); *F02N 2300/102* (2013.01); *F02N 2300/104* (2013.01)

(58) Field of Classification Search
CPC ...... B60W 10/02; B60W 10/06; B60W 10/08; B60W 20/40; B60W 2510/083; B60W 2710/0644; B60W 2710/065; B60W 2710/081; B60Y 2200/92; B60Y 2300/43; F02D 2200/101; F02D 41/0097; F02D 41/062; F02D 41/3005; F02N 11/00; F02N 11/04; F02N 11/0848; F02N 2200/022; F02N 2200/041; F02N 2200/042; F02N 2300/102; F02N 2300/104; Y02T 10/6226; Y02T 10/6286
See application file for complete search history.

METHOD FOR MANAGING A TRANSIENT PHASE OF THE STARTING OF A HEAT ENGINE BY AN ELECTRIC MOTOR

The invention relates to hybrid, combustion and electric, drive systems, particularly for motor vehicles.

More specifically, the present invention relates to a method for controlling a transient phase in the starting of a combustion engine, as it takes over from an electric machine, in a vehicle hybrid drive system.

BACKGROUND OF THE INVENTION

In the known way, vehicles referred to as hybrid comprise a hybrid drive system having a combustion (heat) engine and an electric machine. In this context, those skilled in the art are well aware that controlling the transient phase, as the combustion engine takes over from the electric machine to drive the drive shaft, upon start-up of such a hybrid drive system, is somewhat tricky.

There are two techniques conventionally used for starting the combustion engine. The first known technique, which is the more widespread, uses a "traditional" starter; in this case the drive shaft is driven by a toothed wheel, via the crankshaft, in order to allow the combustion engine to start. The second technique uses an alternator-starter. In this case, the electric machine drives a belt system engaging with a set of pulleys to turn the drive shaft and start the combustion engine. The operation of the electric machine in the context of the electric starting of the combustion engine of a hybrid drive system is overseen by an electronic control unit or ECU, the English acronym ECU being well known to those skilled in the art. The overseeing of the start by the ECU also involves a dimension whereby the combustion engine injection device is controlled.

Furthermore, as is known, there are numerous configurations of hybrid engine, it notably being possible for the electric machine to be positioned in different locations within the drivetrain.

SUMMARY OF THE INVENTION

The present invention considers only instances in which the electric machine is positioned so as to be able to drive the engine without driving the wheels, namely positioned in P0, P1 or P2 in FIG. 2. In other words, the electric machine needs to be positioned, with respect to the clutch, in such a way that the clutch can be configured so that said electric machine drives the drive shaft without driving the wheels. In practice, the electric machine, in the context of the present invention, is preferably positioned upstream of the clutch and in parallel with the crankshaft.

In this context, as was indicated hereinabove, control over the transient phase, where the combustion engine is taking over from the electric machine to drive the drive shaft, is somewhat complex.

Specifically, in order to improve the efficiency of the start of a hybrid drive system, it is of prime importance to determine the moment at which the combustion engine is capable of driving the drive shaft. Now, according to the prior art, when the hybrid drive system is positioned upstream of the clutch, the increase in engine speed is achieved by the electric machine and the injection device is permitted to inject fuel into the combustion engine as soon as the drive shaft has reached a certain engine speed, for example the low-idle speed, even though there is still some level of uncertainty as to the ability of the combustion engine to drive the drive shaft alone.

The invention seeks to overcome this disadvantage and to make it possible to determine with certainty that the combustion engine is able, alone, to drive the drive shaft, so that the electric machine can thereupon be stopped.

To this end, one subject of the invention is a method for managing the starting of a combustion engine of a hybrid drive system comprising a combustion engine and an electric machine, as well as a drive shaft having an engine speed, the electric machine producing torque to start the combustion engine and drive the drive shaft at least during an initial phase of the start, said method having a transient starting phase during which the combustion engine drives the drive shaft and on completion of which the electric machine is stopped, the electric machine being regulated, during the initial phase and during the transient phase, with a first engine speed setpoint, said transient phase beginning when the drive shaft reaches the first engine speed setpoint and remains steady, and the combustion engine being regulated, during the transient phase, with a second engine speed setpoint, said second setpoint being higher than the first setpoint by a predetermined margin, said method involving, during the transient phase, controlling the torque produced by the electric machine during said transient starting phase, said control involving measuring the torque produced by the electric machine and said control being configured so that the electric machine is stopped as soon as said torque drops below a predetermined threshold, so that said control determines that the torque produced by the electric machine is tending toward zero torque.

By virtue of the invention, the electronic control unit effectively determines that the combustion engine is capable of taking over from the electric machine by observing the decrease towards zero of the torque supplied by said electric machine.

Specifically, the electronic control unit is calibrated in such a way that the combustion engine is regulated, after the electric machine has allowed it to reach the first setpoint (typically equal to the low-idle speed), to a second engine speed setpoint higher by a predetermined margin than said first setpoint. Said electronic control unit is then capable of observing the decrease in the torque produced by the electric machine.

As soon as it is determined that said torque produced by the electric machine is tending toward zero, the electronic control unit stops said electric machine and the combustion engine drives the drive shaft, typically being regulated to the low-idle speed.

According to one embodiment, as soon as the electric machine is stopped, the combustion engine is regulated using the first engine speed setpoint.

According to one embodiment, said first engine speed setpoint is equal to the low-idle speed of said combustion engine.

According to one embodiment, said low-idle speed is comprised between 600 revolutions per minute and 1200 revolutions per minute.

The invention also relates to an electronic control unit for a vehicle, particularly for a motor vehicle, configured to implement the method as briefly described hereinabove.

The invention also relates to a motor vehicle comprising a hybrid drive system with a combustion engine and an electric machine, said motor vehicle comprising a plurality of wheels, a clutch, a drive shaft and a crankshaft connected to the drive shaft, said electric machine being connected to the drive shaft in such a way as to be able to drive said drive shaft without driving the wheels, and the motor vehicle also comprising an electronic control unit as briefly described hereinabove.

According to one embodiment, in such a motor vehicle, the electric machine is connected to the drive shaft upstream of the clutch and in parallel with the crankshaft.

Other features and advantages of the invention will become apparent from the following description, given with reference to the appended figures that are given by way of non-limiting example and in which identical references are given to objects that are similar.

BRIEF DESCRIPTION OF THE DRAWINGS

The invention will be better understood upon reading the following description, given solely by way of example, and with reference to the appended drawings.

DETAILED DESCRIPTION OF THE PREFERRED EMBODIMENTS

The invention is presented primarily with regard to an application in the context of a motor vehicle hybrid, combustion and electric, drive system. However, other applications are also targeted by the present invention, notably any implementation in any hybrid, combustion and electric, drive system for any type of land or non-land vehicle provided that the electric machine is connected to the drive shaft upstream of the clutch and preferably in parallel with the crankshaft.

Figure 1:
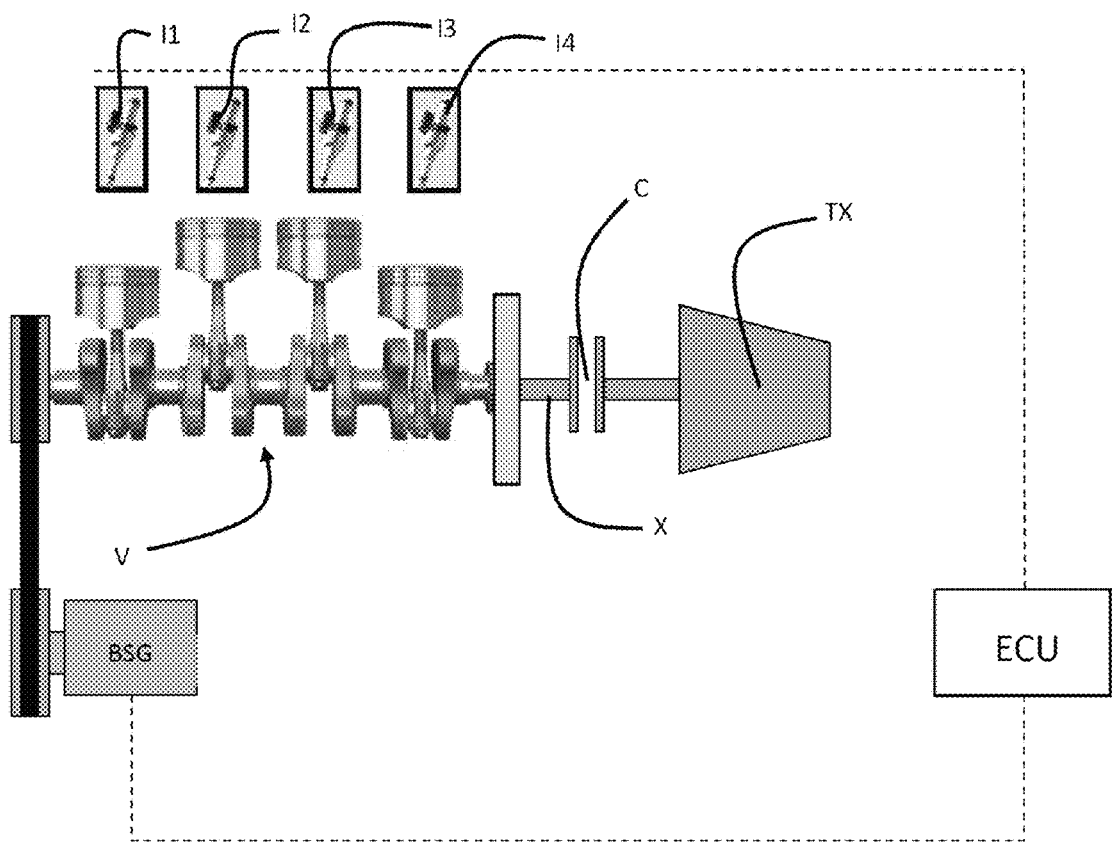
FIG. 1 is a diagram of a hybrid drive system comprising an electric machine intended to start a combustion engine according to the present invention.

With reference to FIG. 1, which schematically depicts a hybrid drive system, the method according to the invention relates to the starting of such a hybrid drive system. As indicated previously, the electric machine BSG (the reference BSG corresponding to the acronym BSG, which stands for Belt-driven Starter Generator) of the hybrid drive system is connected to the drive shaft X upstream of the clutch C (and of course upstream of the differential TX) and in parallel with the crankshaft V.

Figure 2:
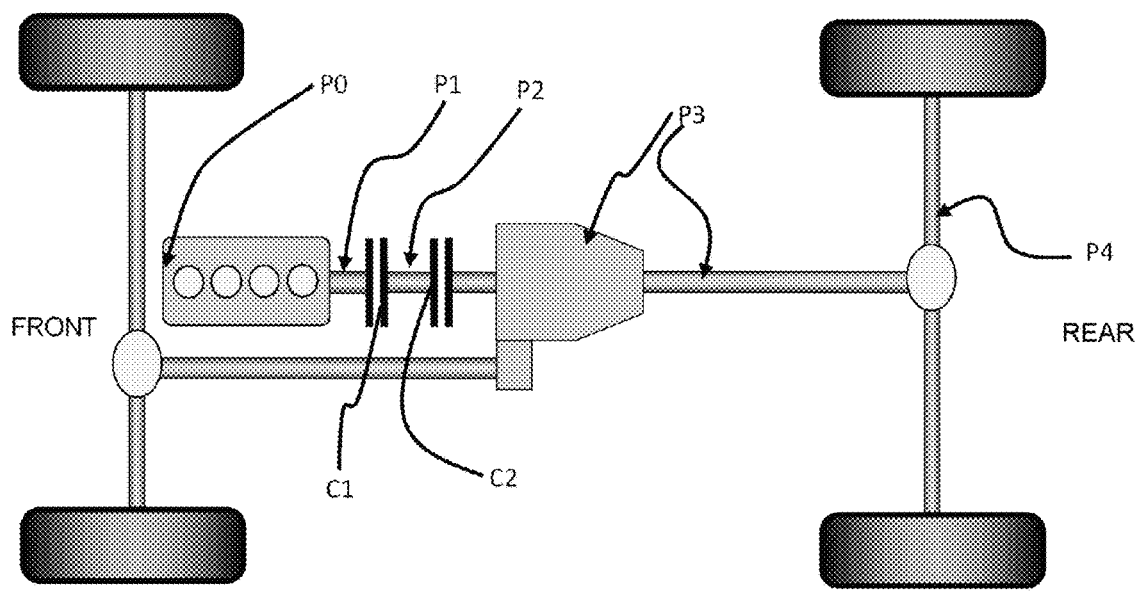
FIG. 2 is a diagram of a hybrid vehicle with the possible positions of the electric machine in the drivetrain.

FIG. 2 shows a simplified diagram of a hybrid drive system on the bare bones of a motor vehicle. As depicted, the electric machine of such a hybrid drive system can theoretically be positioned at various points in the drivetrain, notably at P3 (in the gearbox or on the differential) or at P4 (on the rear hub).

In the context of the present invention, however, it is preferably envisioned to use an electric machine positioned at P0, in parallel with the crankshaft and upstream of the clutch. Alternatively, it is conceivable to implement the electric machine, in the context of the present invention, by positioning it at P1, on the crankshaft, or else at P2, at the clutch C0, C1. In practice, the requirement is that the electric machine BSG needs to be able to drive the drive shaft X without driving the wheels. Its position is thus dependent on the clutch which needs to be configured accordingly.

Finally, with reference once again to FIG. 1, the injectors I1, I2, I3, I4 form an injection device which is allowed or not allowed, according to the phase of start in progress, to inject fuel into the combustion engine in order to allow the latter in turn to drive the drive shaft X.

Control over the starting of the hybrid drive system is overseen by the electronic control unit ECU. The starting of the combustion engine of such a hybrid drive system is performed after the electric machine BSG has first of all provided drive to the drive shaft X.

In practice, as soon as a desire to start the combustion engine is detected, by whatever means this might be (action on an ignition key, an electronic starter switch or else action on the clutch pedal or on the accelerator), the electronic control unit ECU commands the electric machine BSG, said electric machine being regulated in such a way that the engine speed, which corresponds to the speed at which the drive shaft X is rotating, reaches a first engine speed setpoint.

According to the invention, the combustion engine itself is regulated using a second engine speed setpoint, higher by a predetermined margin than the first engine speed setpoint, said combustion engine regulation beginning from the moment at which the injection device is allowed to inject fuel into the combustion engine to drive the drive shaft X, namely after said drive shaft has reached the first engine speed setpoint.

Typically, the first engine speed setpoint is equal to the low-idle speed of the engine, namely for example to 600 revolutions per minute, whereas the margin is 100 revolutions per minute, the second engine speed setpoint thus being equal to 700 revolutions per minute.

The present invention is aimed in particular at managing a transient phase of the start, as the combustion engine becomes capable of driving the drive shaft X alone.

Thus, the method according to the invention consists in particular in observing the decrease toward zero of the torque supplied by the electric machine BSG during said transient phase.

In order to do that, the second engine speed setpoint used for regulating the combustion engine is higher by a predetermined margin than the first engine speed setpoint used for regulating the electric machine that drives the drive shaft X at the beginning of the start.

More specifically, the electric machine BSG drives the rotation of the drive shaft X during an initial phase of the start until said drive shaft reaches the first engine speed setpoint. During this initial phase of the start, the injection device I1, I2, I3, I4 is not allowed to inject fuel into the combustion engine.

As soon as the drive shaft X reaches the first engine speed setpoint, a transient phase of the start begins; the injection device I1, I2, I3, I4 is allowed to inject fuel into the combustion engine and said combustion engine is regulated using, as its setpoint, the second engine speed setpoint, which is higher by a predetermined margin than the first engine speed setpoint.

The electronic control unit ECU is thus calibrated specially, with two distinct starting engine speed setpoints, one for the electric machine and one for the combustion engine. As was described hereinabove, according to one embodiment, the first engine speed setpoint is equal to the low-idle speed of the combustion engine and the second engine speed setpoint is higher than this, for example by 100 revolutions per minute.

As a result, as the drive shaft X tends to reach the first engine speed setpoint, the electronic control unit ECU is able to observe the decrease toward zero of the torque supplied by the electric machine BSG whereas the combustion engine is taking over the rotational driving of the drive shaft X.

As soon as the electronic control unit ECU determines that the torque supplied by the electric machine BSG is tending toward zero, for example because said torque supplied by the electric machine is dropping below a predetermined threshold, the method according to the invention makes provision for said electronic control unit ECU to stop the electric machine and regulate the combustion engine using an engine speed setpoint preferably equal to the first engine speed setpoint, namely in particular the low-idle speed. Said predetermined threshold, according to one embodiment, is a few N/m, typically comprised between 3 and 5 N/m.

It is then the combustion engine, which has started and is running autonomously, which alone drives the rotation of the drive shaft X.

Figure 3:
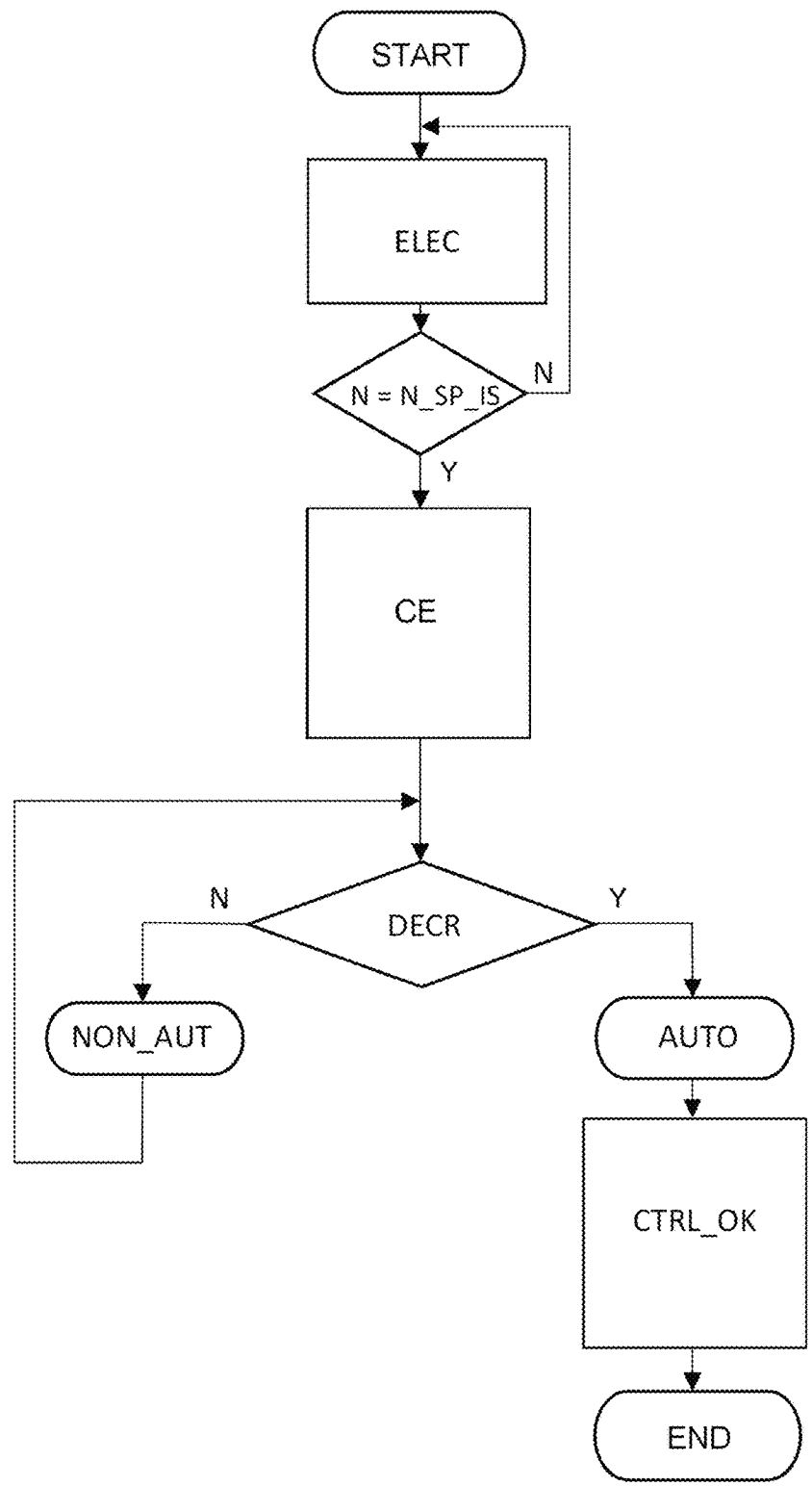
FIG. 3 is a diagram corresponding to the various steps in the control of a transient phase in the electric starting of a combustion engine in a hybrid drive system according to the present invention.

Thus, in summary, with reference to FIG. 3, as soon as a request to start the combustion engine (step START) is detected, during the initial phase of the start the electric machine drives the rotation of the drive shaft while being regulated (step ELEC) in closed-loop control, using a first engine speed setpoint N_SP_IS, typically equal to the low-idle speed of the combustion engine.

As soon as the engine speed N reaches the setpoint N_SP_IS and remains steady, the transient phase of the start begins and the combustion engine is activated (step CE): the injection device is allowed to inject fuel and the combustion engine is regulated using a second engine speed setpoint equal to the first engine speed setpoint increased by a predetermined margin N_SP_IS+ΔN. Said predetermined margin according to one embodiment is equal to 100 revolutions per minute.

The electronic control unit then observes the decrease towards zero of the torque produced by the electric machine (step DECR). As long as the electronic control units does not determine that the torque produced by the electric machine is tending toward zero, the combustion engine is not autonomous (step NON_AUTO).

When the electronic control unit determines that the torque produced by the electric machine is tending toward zero, the combustion engine is autonomous (step AUTO).

The combustion engine is then regulated using an engine speed setpoint equal to the first engine speed setpoint N_SP_IS, typically corresponding to the low-idle speed of said engine (step CTRL_OK). The starting of the hybrid drive system is then over (step END).

It should be noted, furthermore, that the invention is not limited to the embodiment described by way of example and that variants within the competence of the person skilled in the art may be envisioned.

The present invention also relates to a motor vehicle comprising a hybrid drive system with a combustion engine and an electric machine, as well as a clutch, a crankshaft and a drive shaft, the electric machine being connected to the drive shaft upstream of the clutch and preferably in parallel with the crankshaft, and the vehicle comprising an electronic control unit implementing the method as described hereinabove.

The present invention also relates to such a vehicle electronic control unit.

The invention claimed is:

1. A method for managing a starting of a combustion engine of a hybrid drive system that incorporates the combustion engine, an electric machine (BSG), and a drive shaft (X) in connection with a crankshaft of the combustion engine and that turns at an engine speed of the combustion engine, the method comprising:
   in an initial phase (ELEC) of the starting, controlling the electric machine (BSG) to apply a torque upon the drive shaft (X) to turn the drive shaft (X) at a steady first engine speed at a first engine speed setpoint (N_SP_IS);
   in a transient phase of the starting, which commences as soon as said electric machine (BSG) has accomplished the steady first engine speed of the drive shaft (X) at the first engine speed setpoint (N_SP_IS) in the initial phase:
   controlling the combustion engine to commence injection of fuel into cylinders of the combustion engine,
   regulating the combustion engine to drive the drive shaft (X) to a second speed at a second engine speed setpoint, and
   measuring the torque applied by the electric machine (BSG) upon the drive shaft (X),
   said second engine speed setpoint being higher than the first engine speed setpoint by a predetermined margin (ΔN);
   upon an indication via said measuring that the torque produced by the electric machine (BSG) has dropped below a predetermined threshold, thereby indicating that the torque produced by the electric machine (BSG) is tending toward zero torque, stopping the electric machine (BSG) such that the drive shaft (X) is driven entirely by the combustion engine; and
   upon stopping the electric machine (BSG), regulating the combustion engine to drive the drive shaft (X) at the first speed of the first engine speed setpoint (N_SP_IS).

2. The method as claimed in claim 1, wherein said first engine speed setpoint (N_SP_IS) is equal to a low-idle speed of said combustion engine.

3. The method as claimed in claim 2, wherein said low-idle speed is between 600 revolutions per minute and 1200 revolutions per minute.

4. An electronic control unit (ECU) for a motor vehicle, configured to implement the method as claimed in claim 2.

5. An electronic control unit (ECU) for a motor vehicle, configured to implement the method as claimed in claim 3.

6. An electronic control unit (ECU) for a motor vehicle, configured to implement the method as claimed in claim 1.

7. A motor vehicle comprising a hybrid drive system with a combustion engine and an electric machine (BSG), said motor vehicle comprising a plurality of wheels, a clutch (C; Cl, C2), a drive shaft (X) and a crankshaft (V) connected to the drive shaft (X), said electric machine (BSG) being connected to the drive shaft (X) in such a way as to be able to drive said drive shaft (X) without driving the wheels, and the motor vehicle also comprising an electronic control unit (ECU) as claimed in claim 6.

8. The motor vehicle as claimed in claim 7, the electric machine (BSG) being connected to the drive shaft (X) upstream of the clutch (C; Cl, C2) and in parallel with the crankshaft (V).

9. An electronic control unit (ECU) for a motor vehicle, configured to implement the method as claimed in claim 6.

10. The method as claimed in claim 1, wherein the predetermined threshold is between 3 and 5 N/m.

11. The method as claimed in claim 1, wherein the electric machine (BSG) is connected to the drive shaft (X) upstream of a clutch that alternately engages and disengages the drive shaft (X) to wheels of a vehicle.

* * * * *